United States Patent
Wongkar et al.

(10) Patent No.: US 11,017,303 B2
(45) Date of Patent: May 25, 2021

(54) OBJECT COUNT PREDICTION USING DISTRIBUTED PROCESSING

(71) Applicant: Oracle International Corporation, Redwood Shores, CA (US)

(72) Inventors: Adison H. Wongkar, Austin, TX (US); Padmanabhan Natarajan, Shoreline, WA (US); Jeevan Gheevarghese Joseph, Dublin, CA (US); Kendra Mariko Chen, San Jose, CA (US); Vernon W. Hui, Bellevue, WA (US)

(73) Assignee: Oracle International Corporation, Redwood Shores, CA (US)

(*) Notice: Subject to any disclaimer, the term of this patent is extended or adjusted under 35 U.S.C. 154(b) by 884 days.

(21) Appl. No.: 15/792,178

(22) Filed: Oct. 24, 2017

(65) Prior Publication Data

US 2018/0322401 A1 Nov. 8, 2018

Related U.S. Application Data

(60) Provisional application No. 62/500,888, filed on May 3, 2017.

(51) Int. Cl.
   *G06N 5/04* (2006.01)
   *G06F 17/11* (2006.01)
   (Continued)

(52) U.S. Cl.
   CPC .......... *G06N 5/04* (2013.01); *G06F 16/9014* (2019.01); *G06F 17/11* (2013.01);
   (Continued)

(58) Field of Classification Search
   CPC ................................. G06N 5/04; G06F 17/11
   See application file for complete search history.

(56) References Cited

U.S. PATENT DOCUMENTS

| 10,489,822 | B2* | 11/2019 | Wiener | G06Q 30/0255 |
| 2018/0322229 | A1* | 11/2018 | Wang | H04L 65/80 |
| 2018/0322401 | A1* | 11/2018 | Wongkar | G06N 5/04 |

OTHER PUBLICATIONS

Huele et al., "Hyperloglog in Practice: Algorithmic Engineering of a State of The Art Cardinality Estimation Algorithm" Mar. 22, 2013, ACM, pp. 1-10 (Year: 2013).*

(Continued)

*Primary Examiner* — Paulinho E Smith
(74) *Attorney, Agent, or Firm* — Kilpatrick Townsend & Stockton LLP

(57) ABSTRACT

Techniques are provided for accurately and quickly processing distributed stored objects to provide a timely and accurate prediction of the number of live objects a parameterized file request will produce. Stored objects representing previous user webpage visit interactions are stored in different storage locations in a data store. The stored objects at each storage location are processed in parallel by hashing stored objects with a hash function such that they are spread somewhat uniformly into buckets. Sub-buckets in each bucket are formed that correspond to selected category identifiers. Also in parallel, K-minimum values are computed for each sub-bucket to estimate the count of stored objects in the data store. The K-minimum values for sub-buckets corresponding to the same category ID across all buckets are combined, in some cases harmonically, and used to generate a predicted number of live objects responsive to a parameterized file request.

20 Claims, 7 Drawing Sheets

(51) Int. Cl.
    *G06F 16/901*    (2019.01)
    *G06Q 30/02*     (2012.01)
    *G06N 7/00*      (2006.01)
(52) U.S. Cl.
    CPC ..... *G06Q 30/0201* (2013.01); *G06Q 30/0241* (2013.01); *G06Q 30/0269* (2013.01); *G06N 7/005* (2013.01)

(56) References Cited

OTHER PUBLICATIONS

Curcio, Matt, "Sketch of the Day: K-Minimum Values" Neustar // Research, Jul. 9, 2012. Retrieved on Nov. 9, 2017 from https://research.neustar.biz/2012/07/09/sketch-of-the-day-k-minimum-values/, 8 pages.
Huele, et al. "HyperLogLog in Practice: Algorithmic Engineering of a State of The Art Cardinality Estimation Algorithm" 16th International Conference on Extending Database Technology, Mar. 18-22, 2013, retrieved from https://stefanheule.com/publications/edbt13-hyperloglog/ Nov. 9, 2017, 10 pages.
Curcio; Matt "Sketch of the Day: K-Minimum Values", neustar// Research, retrieved Dec. 22, 2017 from https://research.neustar.biz/2012/07/09/sketch-of-the-day-k-minimum-values/ , Jul. 9, 2012, 8 pages.
Huele, et al. "HyperLogLog in Practice: Algorithmic Engineering of a State of The Art Cardinality Estimation Algorithm", published in EDBT Mar. 18-22, 2013, ACM, New York, NY ISBN: 978-4-4503-1597-5, doi 10.1145/2452376.2452456, retrieved Dec. 22, 2017 from https://stefanheuled.com/papers/edbt13-hyperloglog.pdf, 10 pages.

\* cited by examiner

OBJECT COUNT PREDICTION USING DISTRIBUTED PROCESSING

CROSS-REFERENCES TO RELATED APPLICATIONS

This application claims the benefit of and the priority to U.S. Provisional Patent Application No. 62/500,888 filed on May 3, 2017, entitled "SYSTEM FOR CALCULATING PROJECTED REACH," which is hereby incorporated by reference in its entirety for all purposes.

BACKGROUND

Counting stored objects in a data store distributed over two or more storage locations may be helpful in predicting live object delivery. If the stored objects can be counted in an accurate and time responsive manner, the number of live objects for a future time period can be predicted from the stored object count. However, typical processing of search queries for data stores with millions of files are mostly too costly and not completed in the time required, and so are rarely effective for this purpose.

BRIEF SUMMARY

As users interact with computers and/or webpages, data (e.g., files, data records or log messages) can be generated that identify many details corresponding to the interactions (e.g., identifying the webpage, interaction type, involved content object, time, user device type, browser type, user login identifier, etc.). Live objects corresponding to these interactions and are generated as the interactions occur and distributed based on pending live object requests. Thus, a live object is an object generated from intercepting the webpage interactions and so can be referred to as a "generated object" as well. The generated object contains data about the interaction itself, the webpage, the user, or any other data that is intercepted from the interaction. A request can be received for a subset of the live objects, and the subset can be defined by one or more category identifiers (IDs) identified within the request. More specifically, the one or more category IDs can be used to identify select live objects that identify particular characteristics of the represented interactions, where the particular characteristics each correspond to category ID(s). Each live object in the subset can correspond to a specific user and/or specific device, such that a client system can process the subset of live objects to coordinate selectively distributing particular content for a webpage to particular user devices (e.g., and not others). Category IDs correspond to user demographic characteristics, user interests, webpage contents, etc. There are hundreds of category IDs. For example, a live object request may include category IDs indicative of a user demographic category (e.g., males, age 25-40) and a historical interaction with a webpage object (e.g., clicked on link involving electric cars). Receipt of live objects corresponding to the category IDs can facilitate the requestor device to selectively transmit a targeted content object (e.g., advertisement for an electric car) to devices predicted (e.g., by a requestor) to be likely to interact with (e.g., click on) the content object.

The utility of receiving a response with a subset of live objects can depend on a size of the subset. For example, a small subset may result in a determination that the cost of generating or distributing the targeted content object is too high on a per-recipient-device basis. Conversely, a large subset may prohibit distribution of the targeted content object as a result of a total distribution cost being too high. Accordingly, it can be advantageous to generate a preliminary prediction of a size of the subset, which can be used to determine whether to proceed to identify the full subset or to modify the included category ID list to produce a subset of the right size.

One approach for generating the predicted number of live objects is to identify a quantity of stored objects (previously received as live objects) that correspond to the category ID(s) and make a prediction based on that quantity. In many cases this approach takes too much time to produce a result and can sometimes extend to weeks due to the many millions of stored objects and other factors including the configuration of the stored objects and the storage mechanism. It is also the case that this type of querying stored objects may tax processors and keep them from performing other required real-time tasks.

In some embodiments, methods, systems, and computer program products are provided for predicting a live object count derived from stored objects in a data store that is distributed over two or more storage locations. These techniques generate a count that is accurate and in an useful timeframe by utilizing parallel processing of the stored objects at each of the two or more storage locations.

More specifically, in some embodiments, the data store includes many millions of stored objects where each stored object represents at least one user interaction with a webpage. The data store includes stored objects in two or more storage locations. A request for a predicted count of live objects can include an identification of one or more user characteristics to which the live objects pertain in the form of one or more category IDs or one or more relationships between two or more category IDs. The request can also include a specification of a time period corresponding to the predicted count. For example, a request can be received on Oct. 29, 2017 that indicates a preliminary request, conditioned request or general request for live objects collected during Nov. 1-7, 2017 and corresponding to user actions where a user is estimated to be located in the United States and having visited webpages indicating an interest in cloud computing. Before processing the request, a predicted count of responsive live objects can be returned to the requesting device (e.g., to permit canceling or confirming of the request). Alternatively or additionally, the request may be for the predicted count of these live objects.

A first step in generating a predicted count of live objects is to store the live objects in a data store. They first must be merged with stored objects already existing in the data store in some cases. In some embodiments, data in live objects represent user interactions with webpages. The live objects include a profile ID, user ID, and/or device ID. Any of these IDs (and/or combination of the IDs) can be used to merge the new live objects with older stored objects with the same identifier(s) so that multiple visits to the same webpage (e.g., by the same user, using the same device and/or within the same session) are represented only once in the count. Merging stored objects based on a profile ID also creates a stored object comprising category IDs generated from visits to more than one webpage by the same user device and/or user associated with the profile ID. Stored objects that are older than a predefined threshold of time can be purged, as they may be of less relevance to predicting a count for live objects.

A next step in predicting the live object count is to count the responsive stored objects. Directly counting responsive stored objects in a large data store is time and processor intensive and would not produce timely results. As a result, an estimated count based on uniform hashing is computed instead that produces accurate counts and is generated in shorter time spans. The user profile ID (or other identifier) in each stored object is hashed using a hashing algorithm that spreads the stored objects into buckets corresponding to a portion of the resulting hash ID. For each bucket, each stored object assigned to the bucket is further assigned to one or more sub-buckets based at least in part on the category IDs in the stored object. For each sub-bucket, a k-minimum value (KMV) is generated. When hashed values are approximately evenly distributed, the KMV can be used with the hashed values in the sub-bucket to estimate a quantity of total hashed values in the entire data store and thus for each category ID occurrence in the entire data store. The counts of each sub-bucket corresponding to the same category ID in each bucket may then be combined to form a more accurate prediction of the total quantity of stored objects corresponding to the category ID in the entire data store. Then the predicted number of live objects in an identified time period that contain that category ID can be generated from the total quantity of stored objects corresponding to that category ID, the total number of stored objects in the data store, and other variables.

Generally, most of the processing for buckets and sub-buckets is performed locally for each system associated with each storage location in the data store such that the processing is distributed to at least two or more processors. The combining the KMVs to produce a total quantity of stored objects and predicting the responsive count of live objects from that quantity may be performed at a central location. Thus, the described embodiment provides a predicted live object count that is both accurate and delivered in an acceptable time frame. This is due at least in part to using a KMV technique to facilitate estimating a count via an analysis of a portion of object data, and distributing processing of the stored objects in buckets and sub-buckets over one or more processors so that processing can be performed in parallel.

One embodiment described in this disclosure is a method for predicting a count of live objects by processing a plurality of stored objects distributed over two or more storage locations, the method includes receiving a communication that corresponds to a request for a predicted count of live objects that are associated with one or more particular category identifiers (ids) of a plurality of category ids, the communication identifying the one or more particular category ids. The method also includes identifying a hash function. The method further includes at each storage location of two or more storage locations retrieving a plurality of stored objects, each stored object of the plurality of stored objects including: a profile ID that includes an identification of a user device that interacted with a webpage; a site ID that identifies the webpage; and at least one category ID of the plurality of category ids. The method also includes identifying, for each stored object of the plurality of stored objects, a hash ID for the stored object generated using the hash function. The method also includes assigning, for each stored object of the plurality of stored objects, the stored object to a bucket of a plurality of buckets, the assignment being based at least in part on the hash id; for each bucket of the plurality of buckets. The method yet includes assigning, for each stored object of the plurality of stored objects that is assigned to the bucket, the stored object to one or more sub-buckets of a set of sub-buckets corresponding to the bucket, each sub-bucket of the set of sub-buckets corresponding to a category ID of the plurality of category ids. The method also includes generating, for each sub-bucket of the set of sub-buckets corresponding to the bucket, a k-minimum value for the sub-bucket, based at least in part on the hash IDs of the one or more stored objects of the plurality of stored objects assigned to the sub-bucket. The method also includes identifying an inter-location group of sub-buckets, each sub-bucket of the inter-location group of sub-buckets corresponding to a particular category ID of the one or more particular category IDs and being associated with a storage location of two or more storage locations, where the inter-location group of sub-buckets includes at least two sub-buckets associated with different storage locations of the two or more storage locations. The method also includes generating, based at least in part on combining each k-minimum value generated for the inter-location group of sub-buckets, the predicted count of the live objects. The method further includes transmitting a response to the communication that is indicative of the predicted count of the live objects.

This embodiment may contain the additional following features: where combining each k-minimum value generated for the inter-location group of sub-buckets is a harmonic combining; where the plurality of stored objects is stored using variable bit coding of the hash ID identified for each stored object of the plurality of stored objects; where the predicted count of the live objects includes counting only stored objects corresponding to one or more predetermined site IDs; where the request includes a recency value and/or a frequency value, and the method further including filtering the plurality of stored objects for the recency value and/or the frequency value; where before generating the predicted count of the live objects expired profile IDs are removed from the plurality of stored objects and/or expired web site visit records are removed from the plurality of stored objects; and where the hash function produces a uniform distribution of stored objects into buckets.

Implementations of the described embodiment may include hardware, a system, or computer software on a computer-accessible medium. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The present disclosure is described in conjunction with the appended figures.

Figure 1:
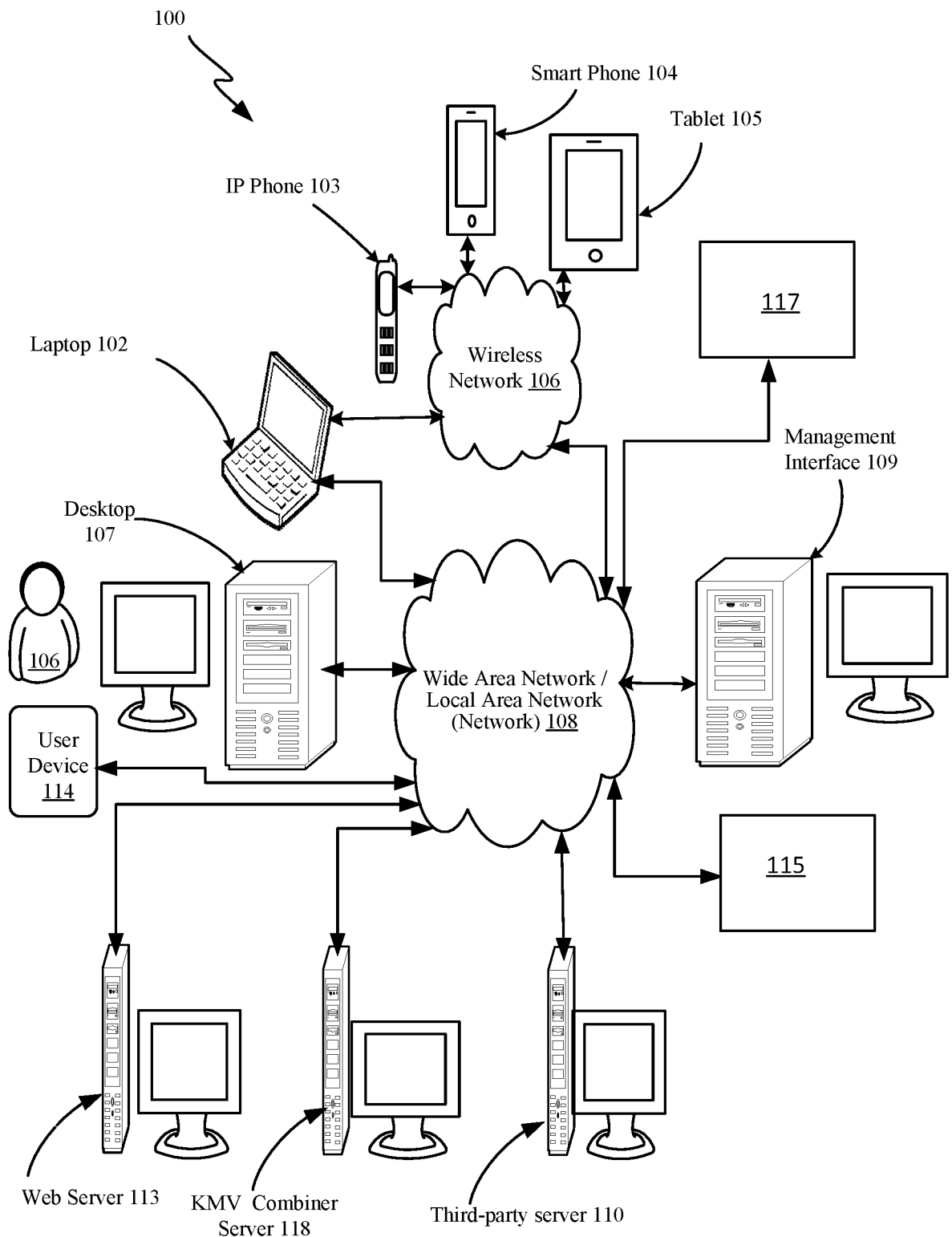
FIG. 1 a system used predicting live object counts in response to live object count requests.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

User interactions with webpages produce live objects that can be related to both the user and/or the user's interaction with a particular webpage. For example, live objects may be generated by html tags or scripting languages downloaded to a user device browser when the browser navigates to certain webpages or by other techniques such an analytical tools. Live objects can include (for example) an IP address of a user device, a webpage, a session identifier, an item clicked on or moused over, a timestamp for the interaction, or virtually any other type of webpage interaction activity. Live objects include one or more category IDs associated with the webpage activity. Category IDs are also associated with user demographics, user interests, content on webpages with which users interacted, etc. Category IDs, can identify various user characteristics, such as in an age group, familial status, marital status, activity interest, consumable interest, personal interest, travel interest, education interest, etc. For example, interaction with a content object (e.g., associated with a topic tag) can cause a category ID indicating an interest in a topic to be identified in a live object. To illustrate, a user device clicking on an electric car link may generate a live object with a category ID associated with electric cars.

Individual user devices can transmit webpage interactions that are intercepted by one of multiple webpage interaction interception systems associated with two or more storage locations. The webpage interaction interception systems process the incoming interactions to generate live objects and detect which of the live objects satisfy constraints identified in an active live object request from a third party server associated with a requester. More specifically, after generating the live objects they may be filtered to form subsets of live objects using category IDs from active live object requests, such that each object in the subset identifies one or more category IDs that corresponds to the category ID(s) in the request. Live object requests include requests for live objects corresponding to category IDs identified in the live object requests. Live objects (and thus stored objects) include information about users with particular interests or demographics that are each associated with a category ID.

After initially processing live objects, the webpage interaction interception system distributes the subsets to the associated third party servers for further processing. The processing may identify additional content that may be subsequently delivered to user devices, each corresponding to at least one of the distributed live objects in one of the subsets to be rendered on the webpages to enhance the users' interaction with the webpages. The additional content may be related to category IDs selected by the live object requester, the webpage interactions themselves, or any other number of variables determined by the live object requester system. For instance, if a user navigates to an electric car webpage, that interaction creates a live object that may be responsive to an active live object request for users navigating to electric car webpages. That live object may become a subset of live objects delivered to a third party server associated with a requester based on a category ID associated with electric cars. The live object may be processed by the third party server, such that additional content can be identified to be presented on the webpage. The third party server may then cause the user device associated with that live object to receive additional content on the webpage currently be rendered by the browser on the user device. That additional content may be related to a particular model of electric car targeted to a category ID contained in the live object request. For instance, if the live object request included a category ID associated with women between 30 and 50 years old, the additional content may be related to electric SUVs if the live object comprises that category ID.

The size of the processed subsets delivered by the webpage interaction interception system to the associated third party servers can vary based on category IDs in the live object requests. Thus, selection of the category IDs used in the live object request, and subsequently used to detect the live objects, control the number of live objects in the resulting subsets. Too many live objects are costly to the client, and too few may mean it is not cost effective to generate the content for too few results. Accordingly, it is important to select Category IDs in a live object request to generate the desired sized subsets with the number of live objects that fall into a range suitable for the client. Accordingly, it is important to provide an predicted number of live objects a webpage interaction interception system will deliver to a third party server in response to a live object request.

In some embodiments, for a given live object request, a prediction can be generated for a number of live objects in the subset that corresponds to the category ID(s) specified in the request. An accurate and fast prediction in this regard can facilitate subsequent confirmation or modification of the request. If the prediction using category IDs indicates that a subset will include an undesirably large number of files, the category IDs may be decreased, replaced, or deleted to create a new prediction request to produce smaller subsets. If the prediction produces subsets that have an undesirably small number of live objects, again, the category IDs may be increased, or replaced a subsequent prediction request to generate larger subsets. Accordingly, the category IDs finally selected can then generally produce desirably sized subsets of live objects during live object processing based on the results generated by live object prediction requests. Right-sized subsets contain the number of live objects in a particular range. Live object requesters may select this range based on their needs.

Processing live object requests to generate a predicted live object count begins with processing live objects responsive to daily ongoing user interactions with webpages as discussed above. Once processed for active live object requests, each live object is added to a portion of the data store associated with the webpage interaction interception system that intercepts it. The data store, spread across two or more storage locations, contains previously stored live objects that become "stored objects" as referred to in this disclosure. Thus, stored objects have been generated by user webpage visits made at a time that has already passed. The data store adds millions of live objects responsive to user webpage visits each day. The data store is large, sometimes storing billions of stored objects. As a result, the data store contains a rich history of past webpage visits.

One method of predicting the size of a subset of live objects that would result from a live object request could be to directly count the stored objects in the data store that match the client selected category IDs. Then a projection based on that count and the total number of stored objects could predict a resulting live object count. This, however, is often not practical because there are too many stored objects to directly count them in a timely manner, and such counting is too processor intensive. Further, the number of stored objects is continuously changing due to the addition of new stored objects and purging of old stored objects that become too stale to be relevant to the prediction process.

More specifically, after live objects are processed for active live object requests, live objects are collected and processed each day. When a live object is received, it can be determined whether the portion of the data store at that storage location includes any existing stored object associated with a profile ID (e.g., corresponding to a user or user device) that matches a profile ID included in the live object. If so, data from the live object can be merged with data from the stored object. If no matching stored object is identified, a new persistent stored object is created based on the particular live object. The merging process can prevent a set of persistent stored objects from having multiple stored objects including a same profile ID and thus more efficiently aggregate data for the profile IDs. Since the live objects are processed and merged daily with the stored objects, the persistent stored objects include all of the collected information for each profile ID. Expiration rules are also applied to remove stored objects or information in the stored object that has expired or aged beyond a predefined threshold. As a result of the merging, for instance, a stored object with a profile related to user John Smith may include interactions with different webpages visited by the associated user device. So if John Smith visited an electric car webpage, a yoga webpage, an audio/video blog, and a home remodeling webpage, those interactions would be included in the stored object. Further, if John Smith visited the same electric car webpage 30 times, a frequency of 30 would be associated with that interaction. However, that interaction with that webpage would only be counted once when predicting the number of live objects. The date that John Smith visited the electric care web page will also be associated with the interaction such that a "recency" value may be relevant to a particular client who only wants a prediction based on, for instance, interactions in the last 72 hours.

The persistent stored objects are then processed by assigning each stored object to a bucket of a plurality of buckets. For each stored object, the profile ID of the object is hashed (to a 128 bit binary number in some cases) in accordance with a hashing technique. A result of the hashing is used to identify a bucket to which the stored object is to be assigned. For example, a b number of bits from right most portion of the binary representation of the profile ID can be associated with a single bucket (e.g., out of a set of buckets, with the set including $2^b$ buckets, also referred to as shards or partitions. The bucket selection is thus determined, at least in part, by the hash ID for each stored object that is generated by a hash function and the profile ID. Stored objects within each bucket of the plurality of buckets are put into one or more sub-buckets, with each sub-bucket corresponding to a category ID. Another portion of the hash bits, q, are, assigned as the hash value for the profile ID, where the q bits are a different set of bits in the hashed value than the b bits. In some cases q=63. Each bucket can then be processed in parallel per bucket, decreasing the time required to predict a live object count. Thus, a distributed system can provide for more efficiently and quickly producing a predicted file count result for a request.

Each bucket may have sub-buckets corresponding to each category ID represented in the bucket. As discussed above, there can be many hundreds of category IDs such that each bucket will have many hundreds of sub-buckets that correspond to the many hundreds of category IDs. Stored objects that are indexed into a bucket are then placed in one or more category ID sub-buckets that correspond to the categories in the stored object. For example, if a stored objects is associated with both category A and category B, the stored object will be indexed into both the sub-bucket for category A and the sub-bucket for category B.

An estimated quantify of stored objects in the entire data store corresponding to the category ID associated with each sub-bucket can be estimated by generating a k-minimum value (KMV) calculation for the sub-bucket. Furthermore, if an estimation utilizing the relationship between more than one category is required, union, intersection, and/or exclusion sub-buckets are created in each bucket. This sub-bucket estimate is a rough estimate because the total number of stored objects in the each sub-bucket is typically much smaller than the number of stored objects in the data store for the category ID requested in the live object request. Thus, combining the KMVs from all of the sub-buckets in all of the buckets in all of the storage locations will typically produce a more accurate prediction of the count of stored objects with the requested category ID. In some cases, harmonic combining is used. Using this novel technique, a prediction of a live object count can be generated accurately and timely from the combined KMVs using parallel processing distributed across all storage locations.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

FIG. 1 depicts a system 100 that supports systems used for predicting live object counts in response to a request for a predicted live object count. One or more instances of system 100 or any aspect thereof may be implemented in the context of the architecture and functionality of the embodiments described herein. As shown in FIG. 1, system 100 comprises at least one instance of a webpage interaction interception system 117, a KMV computation system 115, a KMV combiner server 118, at least one instance of stored object server 112, at least one instance of web server 113, at least one instance of third-party server 110 (or a client server), at least one instance of management interface 109, and at least one instance of user device 114. User device 114 can represent one of a variety of other devices (e.g., a desktop computer 107, a laptop computer 102, an IP phone 103, a smart phone 104, a tablet 105, etc.) operated by a user 106. The aforementioned servers and devices can communicate through a network 108 (e.g., a wide area network (WAN), a local area network (LAN), etc.).

The aforementioned servers and devices in system 100 are designed and configured to enable a user at user device 114 to visit (e.g., browse) a webpage served by web server 113. While browsing the webpage, various user data such as user ID and other interactions with the webpage are tracked. Exemplary techniques for tracking track user data and interactions with a webpage include placing cookies on a user device, running scripting languages on a user device placed there from downloading a webpage, using commercial analytic tools, etc.

Third-party server 110 initiates live object requests with one or more category IDs or an intersection, union, or exclusion of two or more category IDs. One of skill in the art will recognize that there can be up to millions of category IDs. For example, in the case of the union of the category ID corresponding to women over 40 with the category ID corresponding to women with children under two years old would produce as a match a woman over 40 with a child under two years old. Another example using a category ID corresponding to men who like fishing but excludes the category ID corresponding to people who like to eat fish. Accordingly, a match would correspond to a user who liked to fish but does not eat them. A further example would be using a category ID corresponding to liking electric cars or a category ID corresponding to an interest in the environment. A match in this case would be anybody that liked electric cars, or who had an interest in the environment, or both. When there is a match, third-party server 110 provides additional content to web server 113 to be delivered to user devices 114 when browsing webpages such as advertising content. Additional content is sent to the user in response to live objects that match a filtering parameter in an ongoing live object request using the tracked data captured in response to a live object request.

Figure 2:
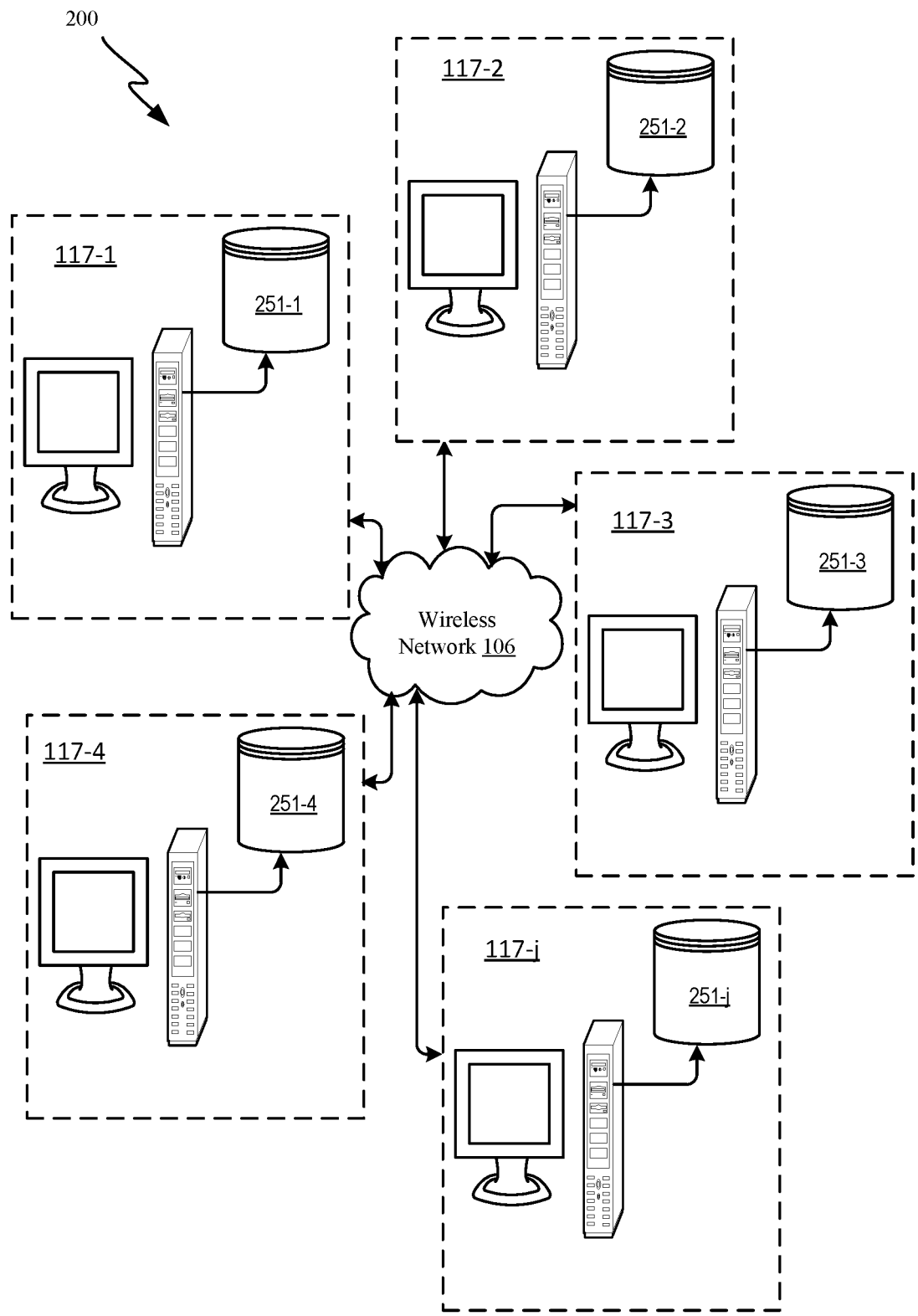
FIG. 2 depicts webpage interaction interception systems for collecting and bucketing live objects.

Further, these user interactions are captured by the webpage interaction interception systems 117 1-$j$, that are each associated with storage locations 1-$j$ indicated by the connected database 251 and are described more fully in FIG. 2. The webpage interaction interception system 117 generates and stores the live objects as stored objects in database 251 after processing the live objects. The profile ID of each live object is hashed by a hashing function selected to produce a uniform distribution of the resulting hash IDs. Each stored object is placed in one of two or more buckets based on the hash ID. Each stored object is also merged with any existing stored objects with the same profile ID in the associated database 251. Each sored file in each bucket is then placed in one or more sub-buckets where the sub-bucket corresponds to a category ID of the stored object.

Third-party server 110 also initiates requests for a predicted count of a subset of live objects that would be generated by a live object request using one or more category IDs. In response to that request KMV computing system 115 responds by computing the KMV of each sub-bucket corresponding to the one or more category IDs in each bucket of a webpage interaction interception system 117. KMV computing system 115 is discussed in more detail in FIG. 3. KMV combiner server 118 combines the KMVs from all sub-buckets corresponding to the same category ID from all buckets to produce an estimated count of stored objects matching each category ID in the entire data store. KMV combiner can predict the live object count using the estimated count of stored objects. The KMV combiner server 118 can combine KMV values using any number of methods including harmonic combining. More details on the KMV combiner server 118 are discussed in FIG. 3 below.

FIG. 2 depicts webpage interaction interception systems 117 1-$j$ associated with databases 251 1-$j$ . . . . Individual user devices 114 can transmit webpage interactions to one of multiple webpage interaction interception systems 117 1-$j$ The webpage interaction interception systems 117 process the incoming interactions and generates live objects from the interactions. The webpage interaction interception systems 117 filters the live objects to detect which of the live objects satisfy constraints identified in any of one or more active live object requests from a third party server 110 associated with a requester. More specifically, live objects may be processed to form subsets of live objects using category IDs from active live object requests, such that each object in the subset identifies one or more category IDs that corresponds to the category ID(s) in the request. Live object requests include requests for live objects corresponding to category IDs identified in the live object requests. Live objects (and thus stored objects) include information about users with particular interests or demographics that are each associated with a category ID.

After initially processing live objects, the webpage interaction interception system 117 distributes the subsets to the associated third party servers 110 for further processing. The further processing may identify additional content that may be subsequently delivered to user devices 114, each corresponding to at least one of the distributed live objects in one of the subsets to be rendered on the webpages to enhance the users' interaction with the webpages. The additional content may be related to category IDs selected by the live object requester, the webpage interactions themselves, or any other number of variables determined by the live object requester system. For instance, if a user device 114 navigates to an electric car webpage, that interaction creates a live object that may be responsive to an active live object request for users navigating to electric car webpages. That live object may become a subset of live objects delivered to a third party server 110 associated with a requester based on a category ID associated with electric cars. The live object may be processed by the third party server 110, such that additional content can be identified to be presented on the webpage of user device 114. The third party server 110 may then cause the user device 114 associated with that live object to receive additional content on the webpage currently be rendered by the browser on the user device 114. That additional content may be related to a particular model of electric car targeted to a category ID contained in the live object request. For instance, if the live object request included a category ID associated with women between 30 and 50 years old, the additional content may be related to electric SUVs if the live object comprises that category ID.

Live object requests generally comprise a time component during which time the webpage interaction interception system 117 sends live objects to the associated third party server 110. As an example, a live object request may include a time period corresponding to when a particular sporting event, such as a World Cup soccer match, is occurring. The live object request may include category IDs corresponding to a user, such as category IDs indicating that the user is estimated as being male, between the ages of 26 and 42, and who has a child. During the World Cup soccer match, the live object requester system may target a user corresponding to a live object that has all of those category IDs with a description of a youth soccer camp and deliver that description to the user device 114 browser to be rendered on the webpage that initiated the generation of the live object. Once the World Cup is over, this live object request would expire and the webpage interaction interception system 117 would no longer deliver live objects to the associated third party server 110.

Once processed for active live object requests, each live object is added to a portion of the data store associated with the webpage interaction interception system 117 that intercepts it. The portion of the data store associated with each webpage interaction interception system 117 1-$j$ is designated as databases 251 1-$j$ and the databases 251 1-$j$ together form the data store. Database 251 contains previously stored live objects. Previously stored live objects become "stored objects" as referred to in this disclosure. Thus, stored objects have been generated by user device 114 webpage visits made at a time that has already passed. As a result, the webpage interaction interception system 117 adds millions of live objects to the database 251 each day in the form of stored objects.

Each webpage interaction interception system 117 can determine if the database 251 associated with it includes any existing stored objects associated with a profile ID that matches a profile ID included in the live object. If so, the webpage interaction interception system 117 merges data from the live object data from the stored object with the same profile ID in database 251. If webpage interaction interception system 117 does not detect a matching stored object, the webpage interaction interception system 117 creates a new persistent stored object based on that live object and stores it in database 251. When the webpage interaction interception system 117 merges live object with stored object with the same profile ID, the webpage interaction interception system 117 creates a set of persistent tored objects stored in database 251 that have unique profile IDs. Since the webpage interaction interception system 117 processes and merges live object with the stored objects on a daily basis, the persistent stored objects in database 251 include all of the collected information for each profile ID. The webpage interaction interception system 117 also applies expiration rules to remove stored objects or information in the stored object that has expired or aged beyond its usefulness in generating predicted counts. The live object collection 117 system will also store frequency values in association with each webpage visit in for each profile ID in database 252. Accordingly, if a user device 114 visits the same webpage 71 times, the frequency value associated with the profile ID will indicate a value of 71. The webpage interaction interception system 117 will also store a "recency" value indicating the most recent visit to the webpage by the user device 114 in the database 252. For example, if Tom Frank visits a particular old car webpage 34 times and his last visit was on 9-21-2017 at 4:45 pm, the database 251 will show a frequency of 34 and a recency of 9-21-2017 at 4:45 pm for a recency value.

The webpage interaction interception system 117 processes the persistent stored objects by assigning each stored object to a bucket of a plurality of buckets in database 251. The webpage interaction interception system 117 hashes the profile ID of each stored object (to a 128 bit binary number in some cases) to form a hash ID for the stored object. The webpage interaction interception system 117 does this in accordance with a hashing technique to identify a bucket to which the stored object is to be assigned. For example, the webpage interaction interception system 117 assigns a b number of bits from right most portion of the binary representation of the hash ID to a single bucket (e.g., out of a set of buckets), with the set including $2^b$ buckets, (also referred to as shards or partitions). Thus, the webpage interaction interception system 117 determines the bucket to assign the stored object to in database 251, at least in part, by the hash ID. Then the webpage interaction interception system 117 assigns stored objects within each bucket of the plurality of buckets to one or more sub-buckets with each sub-bucket corresponding to a category ID. Stored objects can comprise multiple category IDs resulting in the webpage interaction interception system 117 assigning the stored object to multiple sub-buckets in the bucket the stored object is assigned to. For instance, if a store object contains category IDs for A, F, T, and Z, the webpage interaction interception system 117 will assign that stored object to sub-buckets in the bucket corresponding to category ID A, F, T, and Z.

Figure 3:
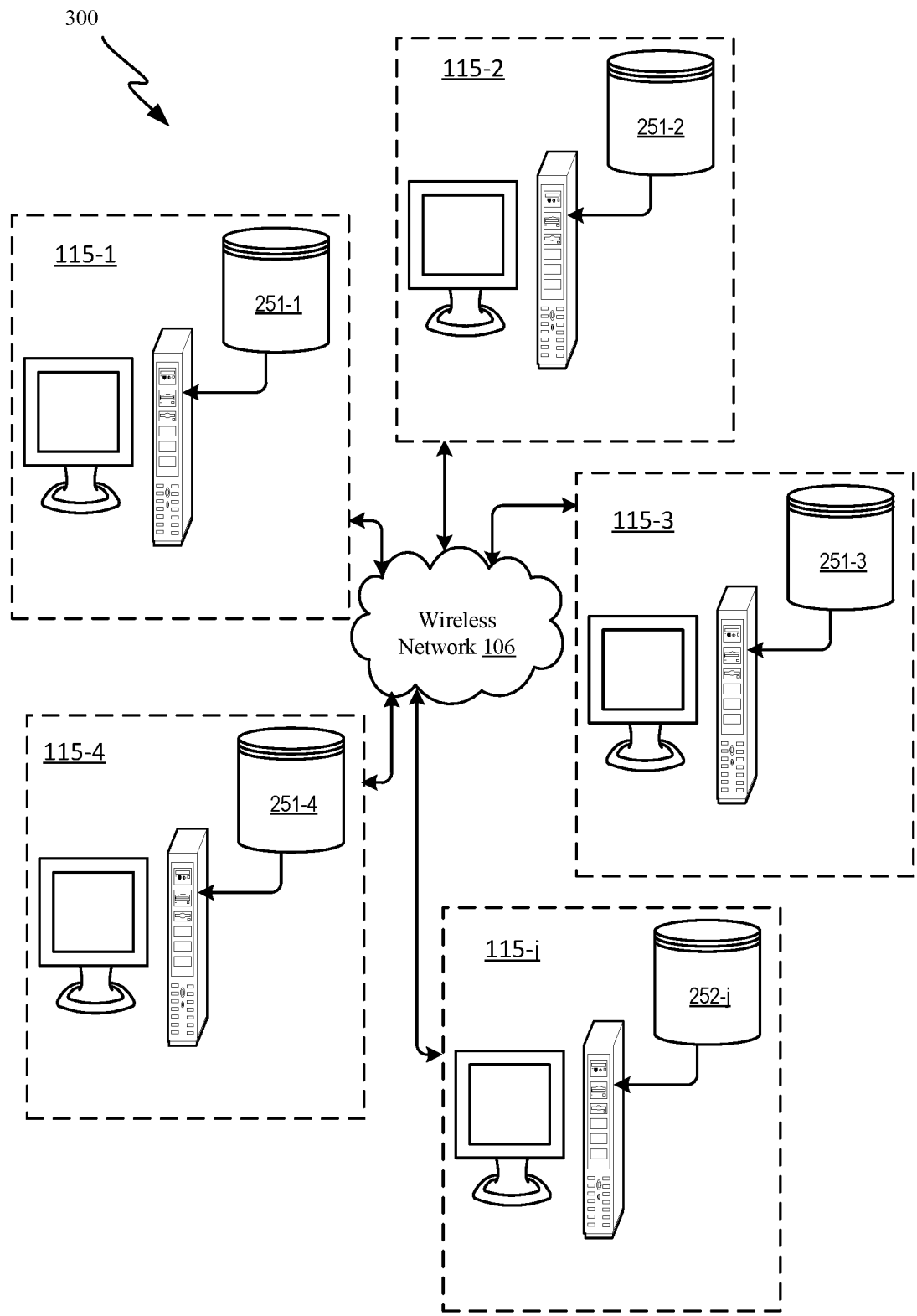
FIG. 3 depicts KMV computing systems for generating k-minimum values for each sub-bucket.

FIG. 3 depicts KMV computing systems 115 1-$j$ for generating k-minimum values for each sub-bucket in each bucket in the associated databases 251 1-$j$. The KMV in each sub-bucket represents an approximate estimate of the number of stored objects corresponding to the category ID associated with the sub-bucket in the entire data store. The KMV computing system 115 generates an estimated count of stored objects in the data store corresponding to a category ID by computing the KMV for the sub-bucket corresponding to the category ID in the database 251. The KMV computing system 115 generates the estimated count by assigning another portion of the hash ID bits discussed in FIG. 2, q, as a KMV hash value for each hash ID, where the q bits are a different set of bits than the b bits used to assign buckets in FIG. 2. In some cases q=63. KMV computing systems 115 computes the estimated number of stored objects comprising the category ID that is associated with the sub-bucket in the entire data store, v, by computing a KMV for the sub-bucket. The KMV computing system 115 uses the formula below in most cases to compute v:

$$v = \frac{k-1}{k_{max}}, \text{ where } k_{max} = \frac{maxhash}{2^q - 1}$$

where maxhash is the maximum hash value in the sub-bucket and k is the number of hash values in the sub-bucket. In some embodiments the number of stored objects in the sub-bucket may be too small, the KMV computing system 115 ay apply different formulas to produce more accurate results. For fewer than 5 stored objects in a sub-bucket, the KMV computing system 115 uses the formula below to compute k and $k_{max}$:

$$k = \sum_{i=0}^{N-1} count_i$$

$$k_{max} = \frac{\max_{i=0}^{N-1} maxHash}{2^q - 1}$$

For the case of more than 5 and less than 20 stored object in a sub-bucket, the KMV computing system 115 uses the following formula after computing the maximum value of the minimum value of all hash values in each sub-bucket:

$$MaxMin = \max_{i=0}^{N-1} (\min(maxHash0_i, maxHash1_i, maxHash2_i, maxHash3_i, maxHash4_i))$$

$$k = \sum_{i=0}^{N-1} \left[ count_i - \sum_{X=0}^{4} I(maxHashX_i > MaxMin) \right],$$

-continued $$\text{where } I(x) = \begin{cases} 1 \text{ if } x = \text{true} \\ 0 \text{ if } x = \text{false} \end{cases}$$

$$correctionFactor =$$

$$\begin{cases} \frac{100}{100 - (10 - countMean)/2} & \text{if } \frac{k_{max}}{2^{31} - 1} < 0.95 \ \& countMean < 10 \\ 1 & \text{otherwise} \end{cases}$$

$$k_{max} = \frac{\max_{i=0}^{N-1} maxHash}{2^q - 1}$$

Furthermore, the KMV computing system 115 can compute an estimation utilizing the relationship between more than one category ID representing the union, intersection, and/or exclusion of two or more category IDs. KMV computing system 115 creates sub-buckets in each bucket by applying the union, intersection and/or exclusion operation to the more than one sub-buckets of the more than one category IDs to fill those sub-buckets in each bucket. The KMV computing system 115 then computes the KMV value for each union, intersection, and/or exclusion sub-buckets in each bucket.

Once the KMV computing systems 115 calculate the KMV for each sub-bucket, the KMV combiner server 118 combines the KMVs from all sub-buckets representing each category ID to form a estimated number of stored objects corresponding to the category ID in the entire data store. In some embodiments, the KMV combiner server 118 uses harmonic combining to estimate the number of occurrences of stored objects using:

$$\text{Estimated} = P * \left( \sum_{y=1}^{N} v_y^{-1} \right)^{-1}$$

for more than 20 stored objects in a sub-bucket, or $$\text{Estimate} = \frac{P}{N} * \frac{k-1}{k_{max}},$$

for fewer than 5 stored objects in a sub-bucket, or $$\text{Estimate} = \text{correction } Facter * \frac{P}{N} * \frac{k-1}{k_{max}}$$

for between 5 and 20 stored objects in a sub-bucket, where N is the number of sub-buckets used in the calculation (could be = to P but in some cases it could be fewer without giving up accuracy, where P is the total number of buckets indexed into). That estimated count forms the basis for the KMV combiner server 118 to generate the predicted count of live objects that is responsive to the live object request using the estimate and other variables such as the time period for the request and the total number of stored objects in the data store.

Figure 4A:
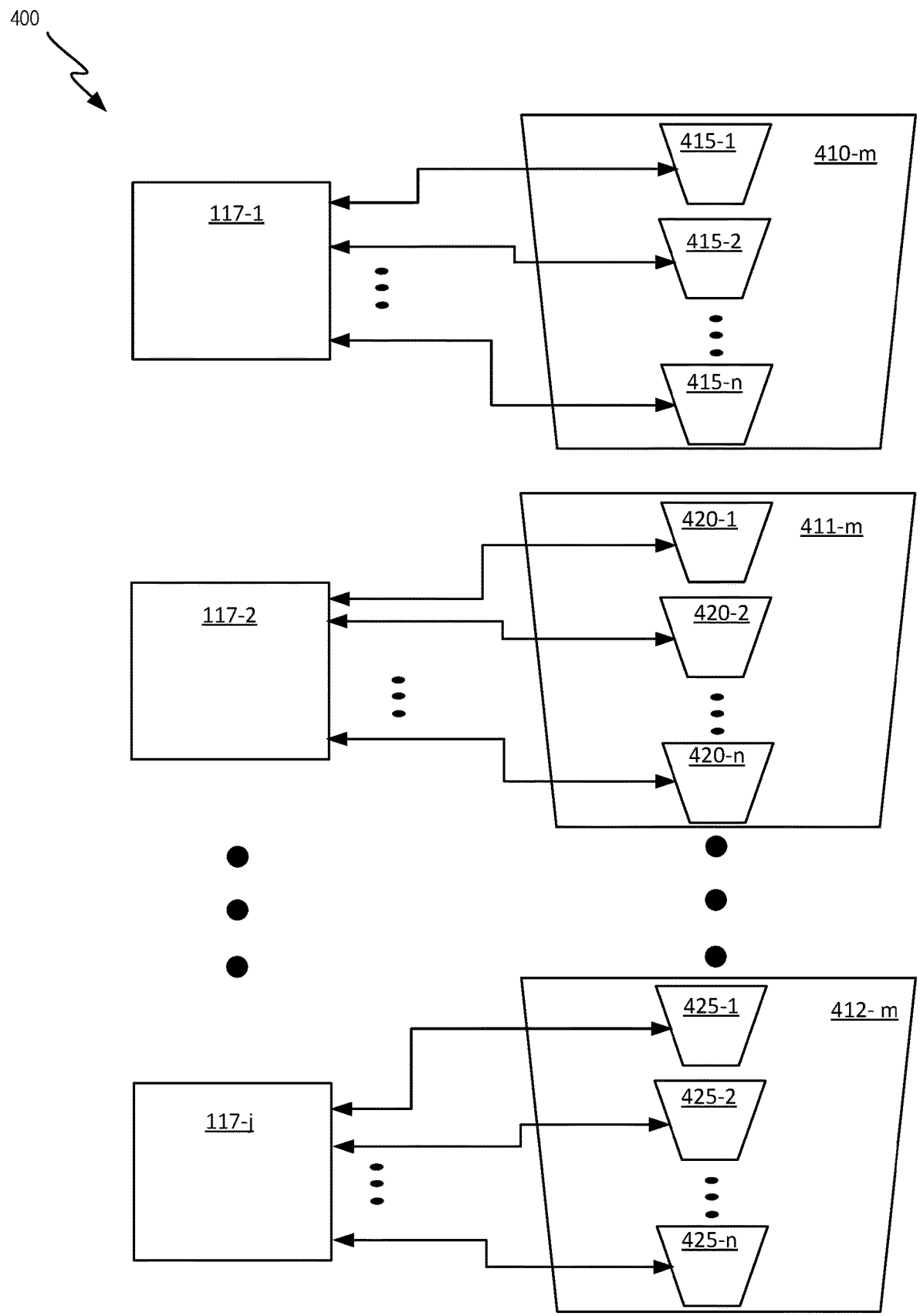
FIG. 4A is a block diagram depicting storing live objects into buckets and sub-buckets.

FIG. 4A is a block diagram depicting storing live objects into buckets and sub-buckets as described in FIG. 2. In FIG. 4A, webpage interaction interception systems 117 1-*j*, where j is the number of distributed systems, interact with each database 251 1-*j*. Each database 251 comprises m buckets, represented in FIG. 4A as 410-*m*, 411-*m* and 412-*m*. Once of skill in the art will recognize that there are m number of buckets in each database 251 associated with the live collection system 117. For instance, Live collection system 117-1 is in communication with buckets 410 1-*m* in database 251-1. Each bucket 410, 411, and 412 comprises sub-buckets 415 1-*n*, 420 1-*n*, and 425 1-*n* respectively. Live collection system 117 assigns each live object to a bucket and a sub-bucket as described in FIG. 2 above in full detail.

Figure 4B:
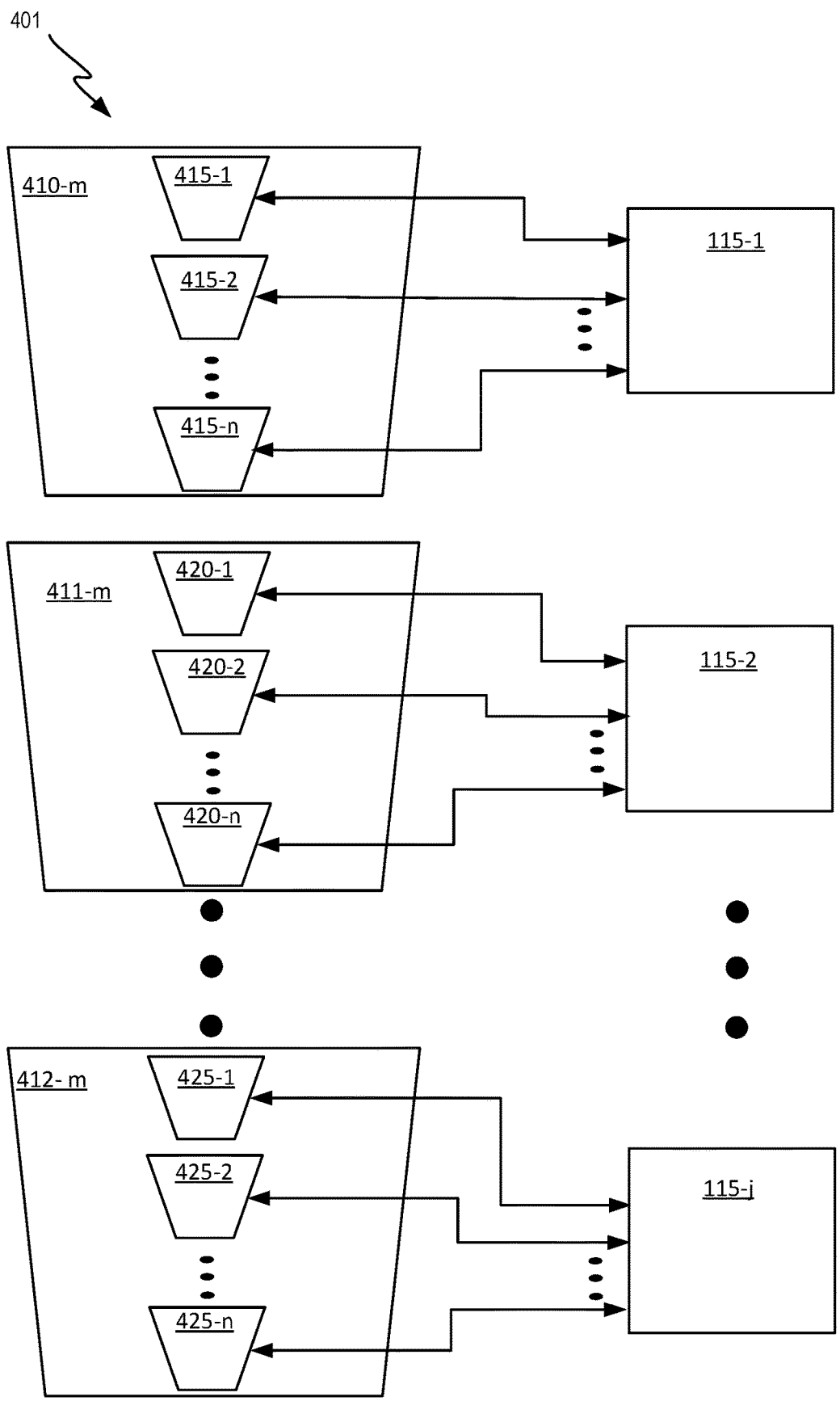
FIG. 4B is a block diagram depicting generating the KMV for sub-buckets

FIG. 4B is a block diagram depicting the interaction between the KMV computing systems 115 1-*j* and databases 251 1-*j* containing m buckets, each of the m buckets containing n sub-buckets, as described in FIG. 3. As shown, each KMV computing system 115 interacts with the m buckets to calculate the KMV for each of the n sub-buckets. For instance, KMV computing system 115-*j* calculates the KMV for each sub-bucket 425 1-*n* in each of the m buckets 412.

Figure 4C:
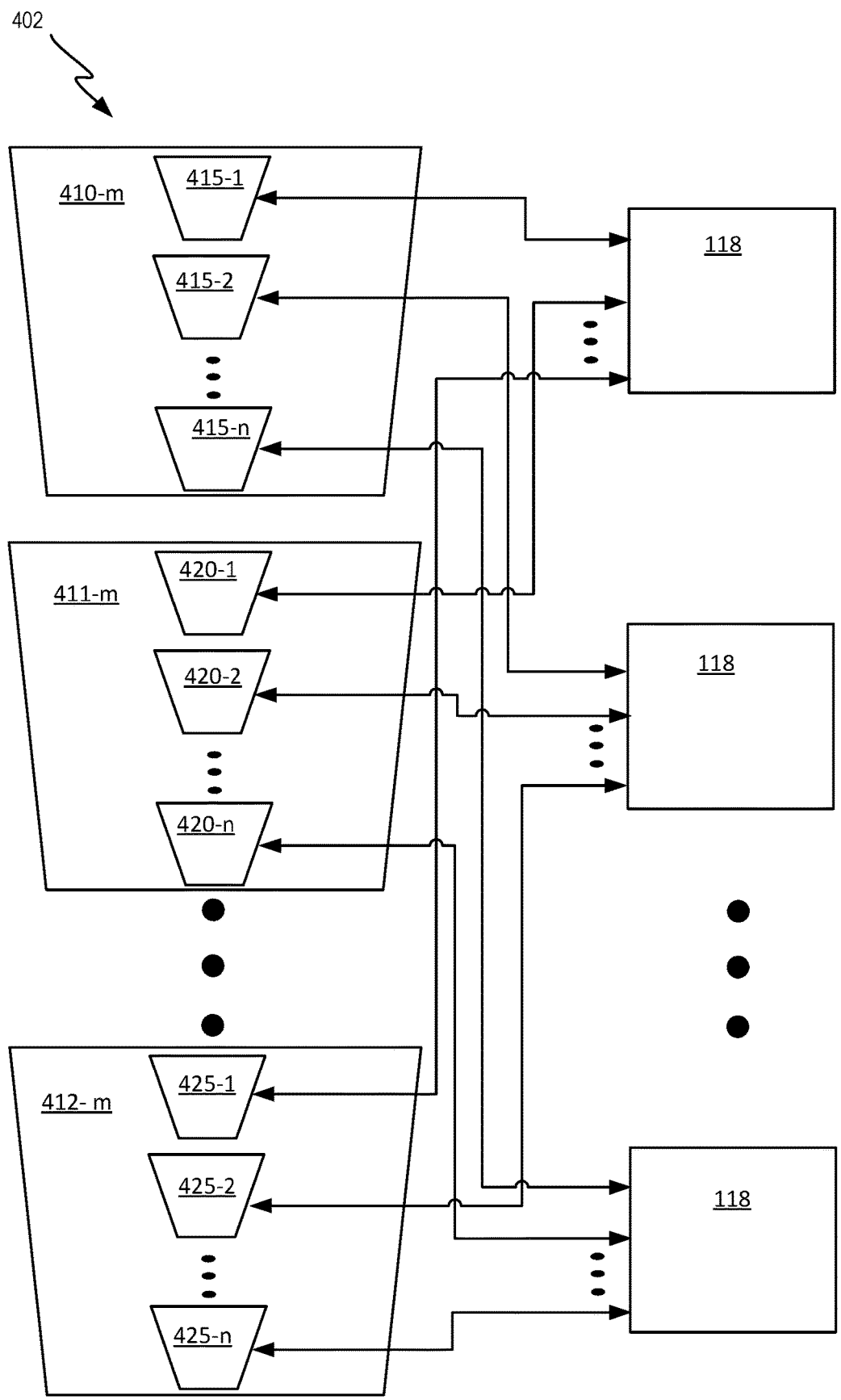
FIG. 4C is a block diagram depicting combining the KMVs from like sub-buckets.

FIG. 4C is a block diagram depicting KMV combiner server 118 combining the KMVs from a sub-bucket in each bucket associated with each live collection system 1-*j* corresponding to the same category ID as described in FIG. 3. For example, KMV combiner server 118 combines the KMV from sub-bucket 415-1 in buckets 410-*m*, sub-bucket 420-1 in buckets 411-*m*, and sub-bucket 425-1 in buckets 412-*m* to compute an estimated number of stored objects in the data store for the category ID associated with the sub-buckets 415-1, 420-1, and 425-1.

Figure 5:
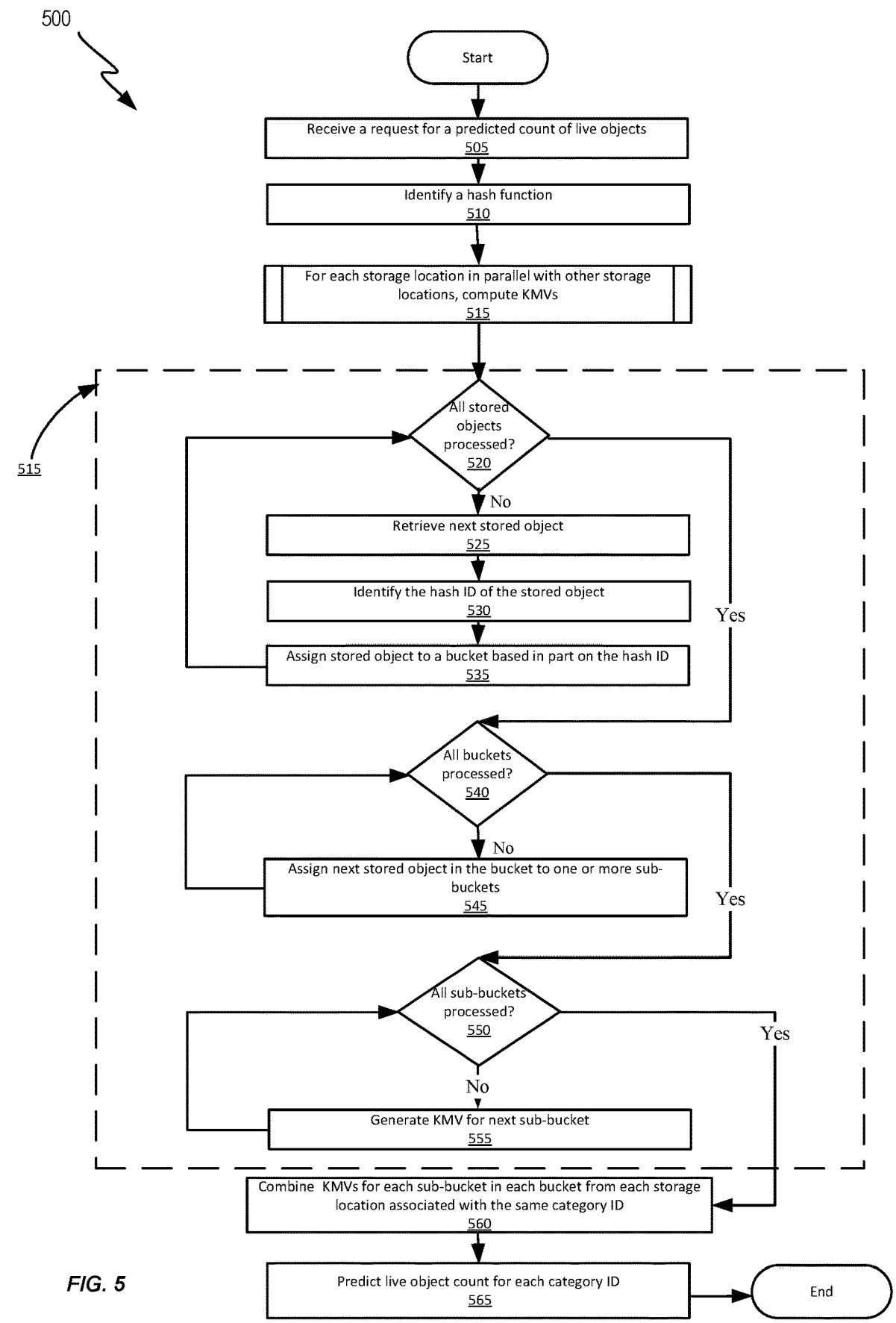
FIG. 5 is a flowchart describing estimating live objects by combining KMVs generated from distributed stored objects.

FIG. 5 is a flowchart describing predicting live object counts using the combined KMVs generated from sub-buckets related to the same category IDs distributed across multiple storage location databases 251. At 505, system 100 receives a request from third party server 110 for a predicted count of live objects. The request includes one or more category IDs and a targeted time period. In some instances, the request further includes a logical relationship between two or more category IDs. For example, a live object request could include the intersection of category ID A associated with electric cars and category ID B associated with green technology for the time period commencing on Nov. 1, 2017 at 12 am and ending on Nov. 2, 2017 at 11:59 pm. System 100 would generate a predicted count of live objects that webpage interaction interception system 117 would intercept in that time from that contained category ID A, category ID B, or both category ID A and category ID B. If the request instead asked for the union of category ID A and category ID B, then system 100 would generate a predicted count of live objects that included both category IDs A and B. At 510, webpage interaction interception system 117 identifies a hash function. As discussed in relation to FIG. 2, the hash function must be a hash function with uniform distribution qualities in order to both evenly place stored objects into buckets and to accurately compute estimated counts using KMV.

At 515, the webpage interaction interception system 117 and KMV computing system 115 processes stored objects and computes the KMV for each sub-bucket in each bucket in parallel for each webpage interaction interception system 117. Accordingly, processing is distributed such that processing stored objects can be performed in parallel across the webpage interaction interception systems 117. At 520, the webpage interaction interception system 117 determines if all stored objects at the associated database 251 have been processed. If not, then at 525 the webpage interaction interception system 117 retrieves the next stored object from the database 251 associated with the webpage interaction interception system 117, the database 251 being a portion of the entire data store.

Next the webpage interaction interception system determines the hash ID of the stored object at 530. The hash ID is typically generated by using the hashing function to hash the profile ID of a stored object. Various identifiers and/or combinations thereof from the object can be used for this function (user ID, device ID, etc.), as long as the same identifier is used consistently. As discussed in relation to FIG. 2, webpage interaction interception system 117 uses a certain portion of the hash ID to assign the stored object to a bucket at 535. Typically, a portion of the right most bits of the hash ID (in binary format) is used. For example, if the hash ID is 67 (1000011 in binary) and the right three bits are used to assign a bucket, the stored object with hash ID 67 would be assigned to bucket 3 (011 in binary). At 520, when the webpage interaction interception system 117 has assigned all of the stored objects to buckets, process 500 proceeds to 540, where the webpage interaction interception system 117 determines if all buckets have been processed to place each stored object in that bucket into one or more sub-buckets.

When it is determined that all buckets have not been processed, process 500 proceeds to 545, where the next stored object in the bucket that has not been assigned to one or more sub-buckets is assigned to one or more sub-buckets by webpage interaction interception system 117. For instance, if the next stored object contains category IDs X, Y, and Z, webpage interaction interception system 117 will assign that live object to sub-buckets associated with category IDs X, Y, and Z.

Once it is determined at 540 that all of the stored objects in each bucket have been assigned at 540, then process 500 continues to 550, where the KMV computing system 115 determines if every sub-bucket has been processed to calculate a KMV. When it is determined that each sub-bucket has not been processed to calculate a KMV, process 500 continues to 555, where a KMV is generated for a next sub-bucket. The KMV computing system 115 can use a different part of the hash ID for each stored object to calculate the KMV.

When it is determined that each sub-bucket has been processed to calculate a KMV, process 500 continues to 560, where the KMV combiner server 118 combines the KMVs for all sub-buckets in all buckets in the associated database 251 that are associated with the same category ID to produce an estimated count. As described in relation to FIG. 3, the KMV combiner server 118 may use harmonic combining techniques or any other combining technique that produces accurate results. For instance, a straightforward averaging technique could be used where the average is computed by adding all of the KMV results for each sub-bucket corresponding to the same category ID, and then dividing by the number of sub-buckets. Typically, harmonic combing has been shown to produce the most accurate results. At 565, the KMV combiner server 118 computes the predicted count of live objects for each category ID in the live object request using the estimated count, the total number of stored objects in the data store, the time period in which the count is required, and other variables. The prediction may be, for example, include the combined KMVs, include a count estimated based on comparison between a time period of interest and a time period associated with the stored objects (e.g., by multiplying the combined KMV by a factor set based on a ratio of the time periods), include a count based on an extrapolation technique, and/or include a count estimated based on a number of stored objects processed.

Further details and descriptions of claimed embodiments herein can be found in U.S. Provisional Patent Application No. 62/500,888 filed on May 3, 2017, entitled "SYSTEM FOR CALCULATING PROJECTED REACH," which is hereby incorporated by reference in its entirety for all purposes.

Various environment in which embodiments of the disclosure operate may include local area networks (LANs)/wide area networks (WANs), wireless networks, user devices (e.g., user stations). The overall network includes any sub-networks and/or wireless networks are in communication with, and enables communication between each of the components of the environment.

Instances of user devices may include virtually any computing device capable of communicating over a network to send and receive information, including instant messages, performing various online activities or the like. It should be recognized that more or fewer user devices may be included within a system such as described herein, and embodiments are therefore not constrained by the number or type of user devices employed.

Devices that may operate as user devices may include devices that can connect using a wired or wireless communications medium such as personal computers, servers, multiprocessor systems, microprocessor-based or programmable consumer electronics, network PCs or the like. In some embodiments, user devices may include virtually any portable computing device capable of connecting to another computing device and receiving information such as a laptop computer, a smart phone, a tablet computer, or the like. Portable or mobile computer devices may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices, and the like. As such, user devices can range widely in terms of capabilities and features. Moreover, user devices may provide access to various computing applications including a browser or other web-based applications. A web-enabled user device may include a browser application that is configured to receive and to send webpages, web-based messages and the like. The browser application may be configured to receive and display graphics, text, multimedia and the like, employing virtually any web-based language including a wireless application protocol messages (WAP) and the like. In one embodiment, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In one embodiment, a user of the user device may employ the browser application to perform various activities over a network (online). However, another application may also be used to perform various online activities.

User devices may include at least one user application that is configured to receive and/or send data between another computing device (e.g., a server component). The user application may include a capability to provide, send, and/or receive content or the like. The user application may further provide information that identifies itself including a type, capability, name, or the like. In one embodiment, a user device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other user devices, or sent between other computing devices.

User devices may be further configured to include a user application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications, or the like. However, participation in online activities may also be performed without logging into the end-user account.

A wireless communication capability is configured to couple user devices and other components within the network. Wireless network may include any of a variety of wireless sub-networks that may further overlay stand-alone and/or ad-hoc networks and the like, to provide an infrastructure-oriented connection for user devices. Such sub-networks may include mesh networks, wireless LAN (WLAN) networks, cellular networks and the like. In one embodiment, the system may include more than one wireless network.

A wireless network may further include an autonomous system of terminals, gateways, routers, mobile network edge devices, and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as user devices with various degrees of mobility. In one non-limiting example, the wireless network may enable a radio connection through a radio network access such as a global system for mobile (GSM) communication, general packet radio services (GPRS), enhanced data GSM environment (EDGE), wideband code division multiple access (WCDMA), and the like. A wireless network may include any wireless communication mechanism by which information may travel between user devices and/or between another computing device or network.

Any of the foregoing networks can be configured to couple network devices with other computing devices and communication can include communicating with the Internet. In some situations communication is carried out using combinations of LANs, WANs, as well as direct connections such as through a universal serial bus (USB) port, or other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In one embodiment, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

In the foregoing specification, the disclosure has been described with reference to specific embodiments thereof. It will be evident, however, that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A method for predicting a count of generated objects by processing a plurality of stored objects distributed over two or more storage locations, the method comprising:
    receiving a communication that corresponds to a request for a predicted count of generated objects that are associated with one or more particular category identifiers (IDs) of a plurality of category IDs, the communication identifying the one or more particular category IDs;
    identifying a hash function;
    at each storage location of two or more storage locations:
        retrieving a plurality of stored objects, each stored object of the plurality of stored objects including:
            a profile ID that includes an identification of a user device that interacted with a webpage;
            a site ID that identifies the webpage; and
            at least one category ID of the plurality of category IDs;
        identifying, for each stored object of the plurality of stored objects, a hash ID for the stored object generated using the hash function;
        assigning, for each stored object of the plurality of stored objects, the stored object to a bucket of a plurality of buckets, the assignment being based at least in part on the hash ID;
        for each bucket of the plurality of buckets:
            assigning, for each stored object of the plurality of stored objects that is assigned to the bucket, the stored object to one or more sub-buckets of a set of sub-buckets corresponding to the bucket, each sub-bucket of the set of sub-buckets corresponding to a category ID of the plurality of category IDs; and
            generating, for each sub-bucket of the set of sub-buckets corresponding to the bucket, a k-minimum value for the sub-bucket, based at least in part on the hash IDs of the one or more stored objects of the plurality of stored objects assigned to the sub-bucket;
    identifying an inter-location group of sub-buckets, each sub-bucket of the inter-location group of sub-buckets corresponding to a particular category ID of the one or more particular category IDs and being associated with a storage location of two or more storage locations, wherein the inter-location group of sub-buckets includes at least two sub-buckets associated with different storage locations of the two or more storage locations;
    generating, based at least in part on combining each k-minimum value generated for the inter-location group of sub-buckets, the predicted count of the generated objects; and
    transmitting a response to the communication that is indicative of the predicted count of the generated objects.

2. The method for predicting a count of generated objects by processing a plurality of stored objects distributed over two or more storage locations, of claim 1, wherein the combining each k-minimum value generated for the inter-location group of sub-buckets is a harmonic combining.

3. The method for predicting a count of generated objects by processing a plurality of stored objects distributed over two or more storage locations, of claim 1, wherein the plurality of stored objects is stored using variable bit coding of the hash ID identified for each stored object of the plurality of stored objects.

4. The method for predicting a count of generated objects by processing a plurality of stored objects distributed over two or more storage locations, of claim 1, wherein the predicted count of the generated objects includes counting only stored objects corresponding to one or more predetermined site IDs.

5. The method for predicting a count of generated objects by processing a plurality of stored objects distributed over two or more storage locations, of claim 1, wherein the request includes a recency value and/or a frequency value, and the method further comprising filtering the plurality of stored objects for the recency value and/or the frequency value.

6. The method for predicting a count of generated objects by processing a plurality of stored objects distributed over two or more storage locations, of claim 1, wherein before generating the predicted count of the generated objects:
    expired profile IDs are removed from the plurality of stored objects and
    expired web site visit records are removed from the plurality of stored objects.

7. The method for predicting a count of generated objects by processing a plurality of stored objects distributed over two or more storage locations, of claim 1, wherein the hash function produces a uniform distribution of stored objects into buckets.

8. A system for predicting a count of generated objects by processing a plurality of stored objects distributed over two or more storage locations, the system comprising one or more processors configured for:
  receiving a communication that corresponds to a request for a predicted count of generated objects that are associated with one or more particular category identifiers (IDs) of a plurality of category IDs, the communication identifying the one or more particular category IDs;
  identifying a hash function;
  at each storage location of two or more storage locations:
    retrieving a plurality of stored objects, each stored object of the plurality of stored objects including:
      a profile ID that includes an identification of a user device that interacted with a webpage;
      a site ID that identifies the webpage; and
      at least one category ID of the plurality of category IDs;
    identifying, for each stored object of the plurality of stored objects, a hash ID for the stored object generated using the hash function;
    assigning, for each stored object of the plurality of stored objects, the stored object to a bucket of a plurality of buckets, the assignment being based at least in part on the hash ID;
    for each bucket of the plurality of buckets:
      assigning, for each stored object of the plurality of stored objects that is assigned to the bucket, the stored object to one or more sub-buckets of a set of sub-buckets corresponding to the bucket, each sub-bucket of the set of sub-buckets corresponding to a category ID of the plurality of category IDs; and
      generating, for each sub-bucket of the set of sub-buckets corresponding to the bucket, a k-minimum value for the sub-bucket, based at least in part on the hash IDs of the one or more stored objects of the plurality of stored objects assigned to the sub-bucket;
  identifying an inter-location group of sub-buckets, each sub-bucket of the inter-location group of sub-buckets corresponding to a particular category ID of the one or more particular category IDs and being associated with a storage location of two or more storage locations, wherein the inter-location group of sub-buckets includes at least two sub-buckets associated with different storage locations of the two or more storage locations;
  generating, based at least in part on combining each k-minimum value generated for the inter-location group of sub-buckets, the predicted count of the generated objects; and
  transmitting a response to the communication that is indicative of the predicted count of the generated objects.

9. The system for predicting a count of generated objects by processing a plurality of stored objects distributed over two or more storage locations, of claim 8, wherein combining each k-minimum value generated for the inter-location group of sub-buckets is a harmonic combining.

10. The system for predicting a count of generated objects by processing a plurality of stored objects distributed over two or more storage locations, of claim 8, wherein the plurality of stored objects is stored using variable bit coding of the hash ID identified for each stored object of the plurality of stored objects.

11. The system for predicting a count of generated objects by processing a plurality of stored objects distributed over two or more storage locations, of claim 8, wherein the predicted count of the generated objects includes counting only stored objects corresponding to one or more predetermined site IDs.

12. The system for predicting a count of generated objects by processing a plurality of stored objects distributed over two or more storage locations, of claim 8, wherein the request includes a recency value and/or a frequency value, and the system further comprising filtering the plurality of stored objects for the recency value and/or the frequency value.

13. The system for predicting a count of generated objects by processing a plurality of stored objects distributed over two or more storage locations, of claim 8, wherein before generating the predicted count of the generated objects:
  expired profile IDs are removed from the plurality of stored objects and
  expired web site visit records are removed from the plurality of stored objects.

14. The system for predicting a count of generated objects by processing a plurality off stored objects distributed over two or more storage locations, of claim 8, wherein the hash function produces a uniform distribution of stored objects into buckets.

15. A non-transitory computer readable medium encoded with instructions executable by a processor for predicting a count of generated objects by processing a plurality of stored objects distributed over two or more storage locations, comprising instructions for:
  receiving a communication that corresponds to a request for a predicted count of generated objects that are associated with one or more particular category identifiers (IDs) of a plurality of category IDs, the communication identifying the one or more particular category IDs;
  identifying a hash function;
  at each storage location of two or more storage locations:
    retrieving a plurality of stored objects, each stored object of the plurality of stored objects including:
      a profile ID that includes an identification of a user device that interacted with a webpage;
      a site ID that identifies the webpage; and
      at least one category ID of the plurality of category IDs;
    identifying, for each stored object of the plurality of stored objects, a hash ID for the stored object generated using the hash function;
    assigning, for each stored object of the plurality of stored objects, the stored object to a bucket of a plurality of buckets, the assignment being based at least in part on the hash ID;
    for each bucket of the plurality of buckets:
      assigning, for each stored object of the plurality of stored objects that is assigned to the bucket, the stored object to one or more sub-buckets of a set of sub-buckets corresponding to the bucket, each sub-bucket of the set of sub-buckets corresponding to a category ID of the plurality of category IDs; and generating, for each sub-bucket of the set of sub-buckets corresponding to the bucket, a k-minimum value for the sub-bucket based, at least in part, on the hash IDs of the one or more stored objects of the plurality of stored objects assigned to the sub-bucket;

identifying an inter-location group of sub-buckets, each sub-bucket of the inter-location group of sub-buckets corresponding to a particular category ID of the one or more particular category IDs and being associated with a storage location of two or more storage locations, wherein the inter-location group of sub-buckets includes at least two sub-buckets associated with different storage locations of the two or more storage locations;

generating, based at least in part on combining each k-minimum value generated for the inter-location group of sub-buckets, the predicted count of the generated objects; and transmitting a response to the communication that is indicative of the predicted count of the generated objects.

16. The non-transitory computer readable medium encoded with instructions executable by a processor for predicting a count of generated objects by processing a plurality of stored objects distributed over two or more storage locations, of claim 15, wherein the combining each k-minimum value generated for the inter-location group of sub-buckets is a harmonic combining.

17. The non-transitory computer readable medium encoded with instructions executable by a processor for predicting a count of generated objects by processing a plurality of stored objects distributed over two or more storage locations, of claim 15, wherein the predicted count of the generated objects includes only permissible files for a file requester.

18. The non-transitory computer readable medium encoded with instructions executable by a processor for predicting a count of generated objects by processing a plurality of stored objects distributed over two or more storage locations, of claim 15, wherein the request includes a recency value and/or a frequency value, and further comprising instructions for filtering the plurality of stored objects for the recency value and/or the frequency value.

19. The non-transitory computer readable medium encoded with instructions executable by a processor for predicting a count of generated objects by processing a plurality of stored objects distributed over two or more storage locations, of claim 15, wherein before generating the predicted count of the generated objects:
    expired profile IDs are removed from the plurality of stored objects and
    expired web site visit records are removed from the plurality of stored objects.

20. The non-transitory computer readable medium encoded with instructions executable by a processor for predicting a count of generated objects by processing a plurality of stored objects distributed over two or more storage locations, of claim 15, wherein the hash function produces a uniform distribution of stored objects into buckets.

* * * * *

UNITED STATES PATENT AND TRADEMARK OFFICE
CERTIFICATE OF CORRECTION

| | | |
|---|---|---|
| PATENT NO. | : 11,017,303 B2 | Page 1 of 1 |
| APPLICATION NO. | : 15/792178 | |
| DATED | : May 25, 2021 | |
| INVENTOR(S) | : Wongkar et al. | |

It is certified that error appears in the above-identified patent and that said Letters Patent is hereby corrected as shown below:

On the Title Page

On page 2, Column 1, item (56) under Other Publications, Line 18, delete "stefanheuled.com" and insert -- stefanheule.com --, therefor.

In the Specification

In Column 4, Line 67, delete "sub-buckets" and insert -- sub-buckets. --, therefor.

In Column 10, Line 4, delete "1-j . . . . Individual" and insert -- 1-j. Individual --, therefor.

In Column 10, Line 6, delete "1-j" and insert -- 1-j. --, therefor.

In Column 13, Line 50, delete "Facter*" and insert -- Factor* --, therefor.

In the Claims

In Column 22, Line 29, in Claim 14, delete "off" and insert -- of --, therefor.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*